Sept. 18, 1934. J. L. KIMBALL 1,974,335
MOTOR OPERATED VALVE AND THE LIKE
Filed Feb. 25, 1932
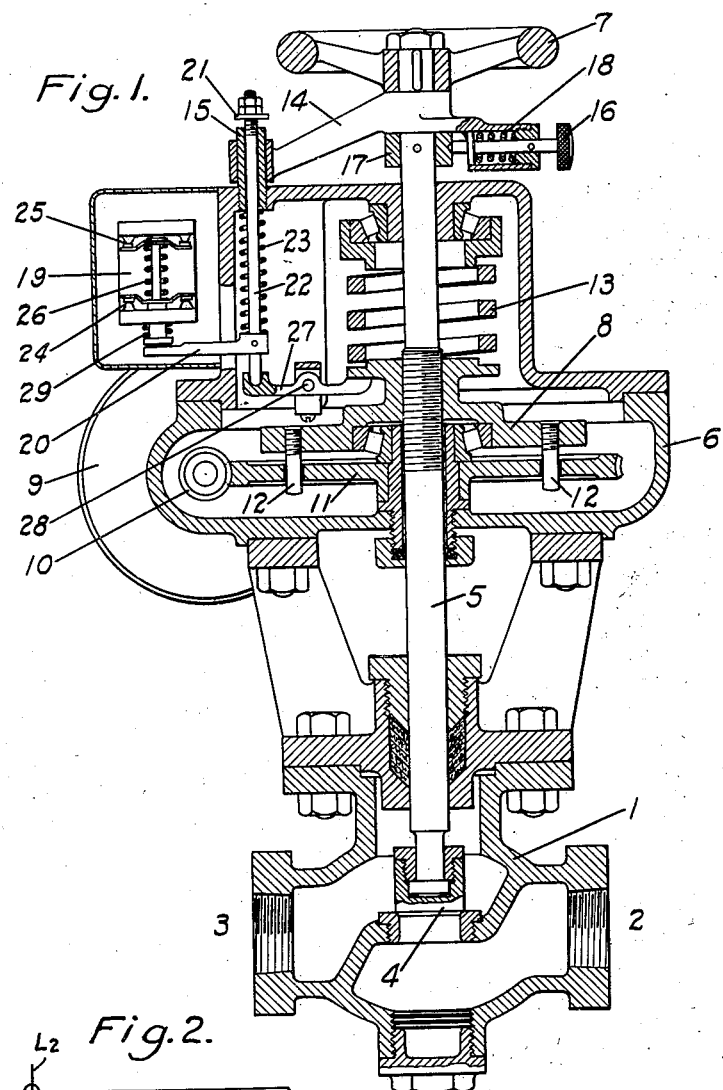
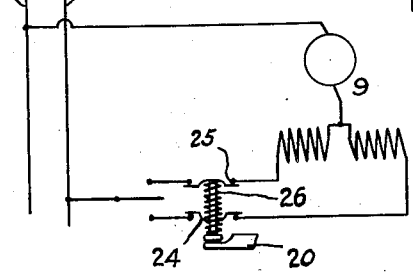
INVENTOR
James L. Kimball Patented Sept. 18, 1934

1,974,335

UNITED STATES PATENT OFFICE 1,974,335

MOTOR OPERATED VALVE AND THE LIKE

James Lewis Kimball, Beverly, Mass.

Application February 25, 1932, Serial No. 595,078

13 Claims. (Cl. 137—139)

My invention relates to improvements in motor operated valves and the like, in which limit switches are required to open the motor circuit at the limit of operation of the valve, thus preventing the stalling of the motor through excessive valve thrust.

The main object of my invention is in providing improved means whereby the valve may be positively seated before opening the motor circuit, and at the same time, preventing any excessive torque load on the motor or the motor speed reduction gearing.

Another object is to provide adjustable means whereby the degree of valve opening may be limited without affecting the degree of valve thrust required to open motor circuit in the valve closing movement.

To accomplish these results, I have devised novel means whereby, under normal torque condition, the driving gear is effective in operating the valve to its closed position, seating against the pressure, and upon a further increase in valve thrust, a part of the gear drive is operated against a compression spring, thus imparting the necessary motion to open the limit switch, and stop the motor.

Fig. 1 shows a vertical section through valve and motor gear casing. Fig. 2 shows a wiring diagram of the motor circuit. The motor circuit can be any preferred arrangement depending on the motor characteristics. My invention being concerned only in the control of the limit switches.

As it is conceivable that at times the full valve opening would not be required, I have devised novel means whereby the degree of valve opening may be limited by manual adjustment. The novel feature of this limit switch arrangement is in the switch actuating means whereby excess valve thrust is effective in opening the motor circuit in any position of the valve closing movement, the same switch actuating means being manually adjustable to limit the valve opening to any amount required without affecting the degree of valve thrust at which the limit switch is opened on the closing movement.

An embodiment of my invention is illustrated in Fig. 1, in which (1) is the valve casing, (2) the inlet for pressure, (3) the outlet, and (4) the valve disc. A valve stem (5) is suitably connected with the valve disc (4), and extends upward through the speed reduction gear casing (6) with a hand wheel (7) at the top, arranged for manual adjustment. (8) is a driving plate threaded to the valve stem (5) and is arranged to be rotated by the motor (9), through worm (10), worm gear (11), and driving pins (12). This driving plate (8) is normally held in the position shown by spring (13), but is so arranged that it can be forced upward against the tension of spring (13) upon further operation of the motor after valve disc (4) is seated.

It will be understood that the valve stem (5) does not rotate but is held against rotation by arm (14) sliding on stud (15). To release the arm (14) so valve stem (5) can be rotated by hand wheel (7), it is necessary to withdraw pin 16 from collar (17). This pin (16) is normally held in engagement with collar (17), by means of spring (18). The limit switches for opening the motor circuit at the closing or open position of the valve, are shown at (19). These switches are operated by arm (20). When the valve is in the open position the arm (14) comes in contact with collar (21) which forces spindle (22) upward against the tension of spring (23), thus moving arm (20) in the proper direction to open motor circuit, when motor is operated in a direction to open valve. The switch blade opened for this direction of operation, would be (24), switch blade (25) still remaining closed for the reverse operation. The spring (26) holds switch blades (24) and (25) properly spaced so both switches are closed when valve is in an intermediate position.

It should be understood that the position of collar (21) is manually adjustable on shaft (22), which permits arm (14) to engage this collar for a greater or lesser degree of valve opening before opening the limit switch, the arrangement of limit switch actuating means being such that the amount of valve thrust required to open the motor circuit is predetermined and fixed by the tension of spring (13), but the degree of valve opening is manually adjustable without affecting the valve thrust releasing point.

When the valve is operated to its seat, in the position shown under the power of the motor, then any further operation of the motor and turning motion of worm gear (11) will result in the driving plate (8), which is threaded to spindle (5), being rotated on the threaded portion of this stem (5) with its lateral movement upward in a direction to compress spring (13). The upward motion of driving plate (8) allows arm (27) to tilt on the pivot point (28) by means of the force exerted by spring (23). This movement gives the necessary motion to lower arm (20), allowing spring (29) to open switch blade (25) and stop motor.

It should be understood that the novel feature of my invention is in the yielding feature of the driving plate (8) which allows it to be separated from the worm gear (11) for the purpose of operating the motor disengaging switch, but which is normally held in its proper position by the spring (13). The motor disengaging switch shown is a preferred arrangement which can be departed from without departing from the scope of the invention.

The advantage of my invention is not only in providing simple and satisfactory means whereby the valve can be positively seated in advance of the opening of the motor circuit, but has the further advantage that should any obstruction lodge between the valve disc and seat, preventing the valve from closing, then the limit switch will be opened. In like manner, should any excessive friction be imparted to the valve stem, such as excessive tightening of stuffing box, which would overload the motor, then the limit switch will be opened.

It will be further understood that spring (13) is installed under the necessary initial tension to prevent separation of the driving plate (8) from worm gear (11), when seating the valve against a definite pressure and for higher pressures or larger size valve, requiring greater valve thrust, the initial tension of this spring is increased accordingly.

It will be observed that the mechanism of my improved excess thrust switching arrangement is extremely simple in construction and affords adequate protection against excessive valve thrust in the operation of valves or other motor operated devices, such as motor operated rheostats or motor operated hoists and the like.

Various modifications might be made in the general arrangement of the parts, without departing from the spirit or scope of the invention. Therefore, without limiting myself to the precise embodiment shown and described, what I claim is:—

1. In a motor operated valve control system comprising a valve, an electrically reversible motor for opening and closing said valve, power transmission gearing connecting the motor with the valve to be operated, a control circuit for said motor, a limit switch in said circuit, limit switch actuating means arranged to open the motor circuit on excess valve thrust at any point in the valve closing movement, and adjustable means co-operating with the limit switch actuating means arranged to open the motor circuit at any point in the valve opening movement, said adjustment not affecting the degree of valve thrust at which the limit switch is opened on the closing movement.

2. In a motor operated valve control system comprising a valve, an electrically reversible motor for opening and closing said valve, power transmission gearing connecting the motor with the valve to be operated, a control circuit for said motor, a limit switch in said circuit, a switch arm normally holding the limit switch in a closed circuit position, a second switch for operating said motor to open and close said valve, means whereby said switch arm is operated on excess valve thrust at any position in the valve closing movement, thereby opening the limit switch, and adjustable means for operating said switch arm at any position in the valve opening movement, said adjustment being so arranged as not to affect the point of operation on excess valve thrust.

3. In a limit switch for motor operated valves comprising an electrically reversible motor, a control circuit for said motor, a switch in said circuit, and arm normally holding said switch in a closed circuit position, said arm being rigidly connected to a longitudinally movable shaft, a support for said shaft, a spring holding said shaft in engagement with said support, means whereby excess power requirements, when motor is operating in one direction, causes said support to be moved out of its normal position and thereby allow said spring to operate said arm and open the motor circuit, and means operated by the motor when operating in the opposite direction to move the shaft against the compression of said spring, and thereby operate said arm to open the motor circuit.

4. In a motor operated valve control system comprising in combination, a valve having a valve stem, a reversible motor for opening and closing said valve, power transmission gearing connecting the motor with the valve stem, a control circuit for said motor, a limit switch in said circuit, limit switch actuating means arranged to open the motor circuit on excess valve stem thrust at any point in the valve closing movement, and adjustable means operated from the valve stem arranged to actuate said limit switch to open the motor circuit at any point in the valve opening movement, said adjustment not affecting the degree of valve stem thrust at which the switch is opened on the valve closing movement.

5. In a motor operated valve control system comprising in combination, a valve having a valve stem for opening and closing the valve, a plate threadably mounted on said stem, a reversible motor arranged to rotate said plate to open and close said valve, a control circuit for said motor, a limit switch in said circuit, a member supported by said plate for holding said switch in a closed circuit position, means due to excess valve stem thrust in the valve closing movement whereby said plate is moved out of its normal position and thereby operates the limit switch to stop the motor, and adjustable means operated from the valve stem arranged to operate said limit switch to open the motor circuit at any position in the valve opening movement.

6. In a motor operated valve control system comprising in combination, a valve stem, a plate threadably mounted on said stem, means normally holding said plate in a fixed position, a motor arranged to rotate said plate to operate the valve stem in either of two directions, a control circuit for said motor, a limit switch in said circuit, means supported by said plate normally holding said switch in a closed circuit position, means due to increased valve stem thrust when motor is operating in one direction to cause said plate to be moved out of its normal position, and thereby operate the switch operating means to open the motor circuit, and means operated from the valve stem when operating in the opposite direction arranged to operate said limit switch to open the motor circuit, the last named means being adjustable for any degree of valve stem travel.

7. In a motor operated valve control system comprising in combiantion, a valve stem, a plate threadably mounted on said stem, a spring normally holding said plate in a fixed position, an electrically reversible motor arranged to rotate said plate to cause said valve stem to be moved in either lateral direction, a control circuit for said motor, a limit switch in said circuit, means supported by said plate normally holding said switch in a closed circuit position, means due to excessive valve stem thrust when motor is operating in one direction to cause said place to be moved out of its normal position against the tension of said spring, thereby causing the switch operating means to open the motor circuit, and means operated by the valve stem for operating said limit switch to open the motor circuit at any predetermined position of the valve stem travel when operating in the other direction.

8. In a control system for motor operated valve, the combination with a valve having a valve stem, of a motor for operating said stem to open and close said valve, an electric circuit for supplying a source of electric energy to operate said motor, a limit switch in said circuit for limiting the operation of the motor in either of two directions, means for operating said limit switch from the operation of said motor comprising a yielding element operated by excess valve stem thrust when said valve is operated in one of said two directions, and means operated from the travel of the valve stem for operating said limit switch when said motor is operated in the opposite direction, the last named means being adjustable for any degree of valve stem travel between the extreme operating positions of said valve stem.

9. In a control system for motor operated valve, the combination with a valve having a valve stem, of a motor and means operated thereby for operating said stem to open and close said valve, a switch arranged to limit the operation of the motor in either of two directions, means for operating said switch from the operation of said motor comprising a yielding element operated by excess valve stem thrust when said valve is operated in one of said two directions and means operated from the valve stem travel when operating in the opposite direction for operating said switch, the last named means being adjustable for any degree of valve stem travel between the extreme operating positions of said valve stem.

10. In a control system for motor operated valve, the combination with a valve having a valve stem, of a motor and means controlled thereby for operating said stem to open and close said valve, an electric circuit for supplying a source of electric energy to operate said motor in either of two directions, a limit switch for controlling said circuit to limiting the operation of said motor in either of said two directions, limit switch operating means normally holding said switch in a closed circuit position, a yielding element operated by excess valve stem thrust when motor is operating in one of said two directions for operating said limit switch operating means to open said circuit and stop said motor, and means operated from the travel of the valve stem when operating in the opposite direction to actuate said limit switch operating means independent of the operation of said yielding member to operate said switch to stop the motor.

11. In a control system for motor operated valve, the combination with a valve having a valve stem, of a motor and means controlled thereby for operating said stem to open and close said valve, an electric circuit for supplying a source of electric energy to operate said motor in either of two directions, a limit switch for controlling said circuit to limit the operation of said motor in either of said two directions, limit switch operating means normally holding said switch in a position in which said motor is operative in either direction, a yielding support for said limit switch operating means operated by excess valve stem thrust for actuating said yielding support to operate said limit switch and stop said motor, and means operated from the travel of the valve stem when operating in the opposite direction to actuate the switch operating means independent of said yielding support, to operate said switch to stop the motor.

12. In a control system for motor operated valve, the combination with a valve having a valve stem, of a motor and means operated thereby for operating said stem to open and close said valve, an electric circuit for supplying a source of electric energy to operate said motor in either of two directions, a switch in said circuit, an operating member for said switch, a yielding support normally holding the operating member in a position to maintain a closed circuit of said switch, means whereby excess valve stem thrust when the motor is operating in one of said two directions causes said support to be moved out of its normal position, means due to said movement to actuate said operating member to open the motor circuit and stop said motor, and means operated by the valve stem travel when the motor is operating in the opposite direction to actuate said switch operating member independent of said yielding support and thereby operate said switch to stop the motor.

13. In a control system for motor operated valve, the combination with a valve of a motor and means operated thereby for operating said valve, an electric circuit for supplying a source of electric energy to operate said motor in either of two directions, a switch for controlling the degree of operation of said motor in either of said two directions, an actuating member normally holding said switch in a position in which said motor is operative in either of said two directions, a yielding support for said actuating member a spring holding said actuating member in engagement with said support, means due to excess power requirements when motor is operating in one of said two directions to cause said support to be moved out of its normal position and thereby allow said spring to operate the switch actuating means to stop the motor, and means operated by the motor when operating in the other direction to move said switch actuating means against the tension of said spring and thereby operate said switch actuating means to stop the motor.

JAMES L. KIMBALL.